Jan. 29, 1929.  
E. W. DAVIS  
1,700,471  
LUBRICANT COMPRESSOR  
Filed Aug. 23, 1924 2 Sheets-Sheet 1
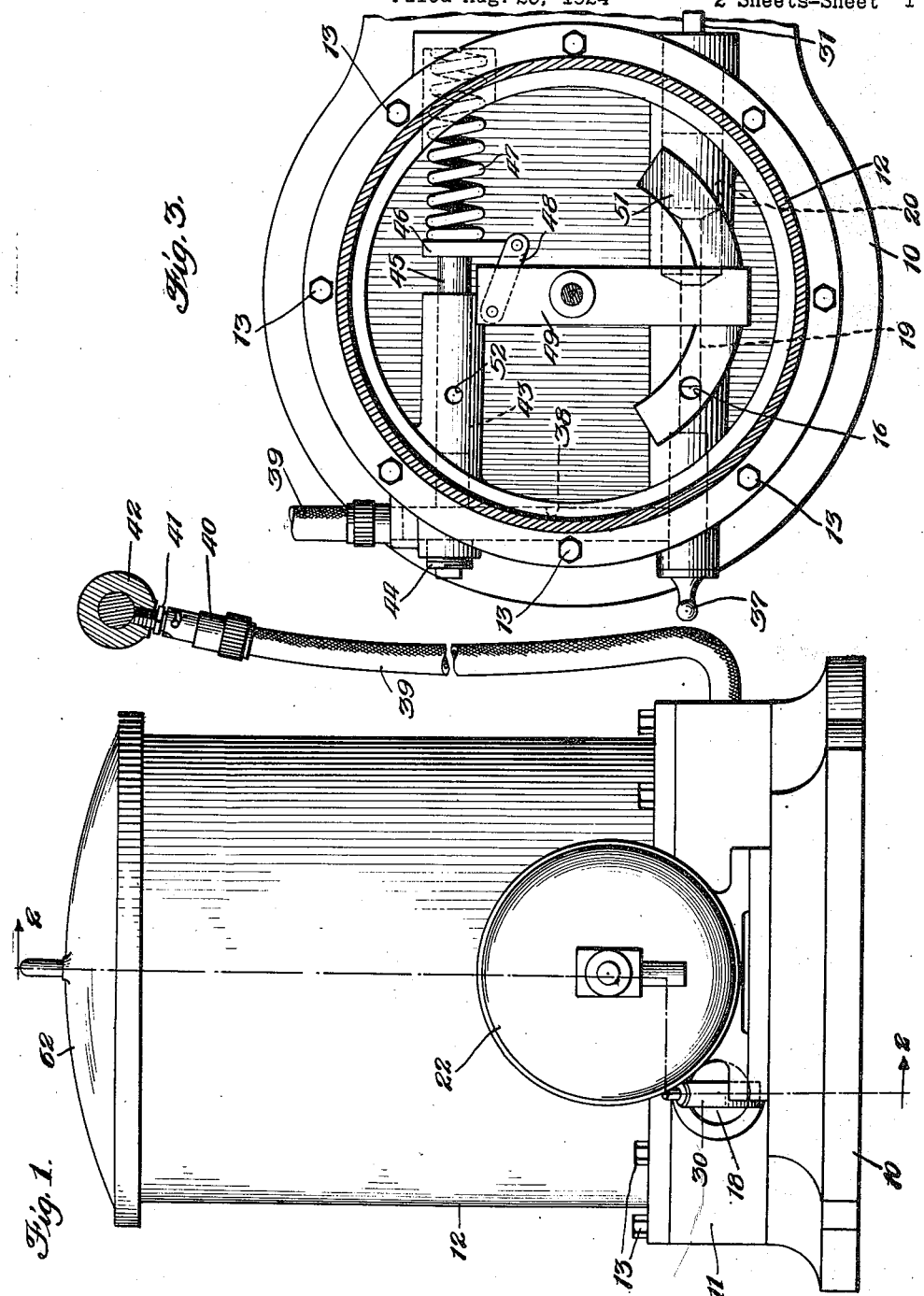
Inventor  
Ernest W. Davis,  
By Earl H. Pierce  
Atty.

Jan. 29, 1929.
E. W. DAVIS
1,700,471
LUBRICANT COMPRESSOR
Filed Aug. 23, 1924 2 Sheets-Sheet 2
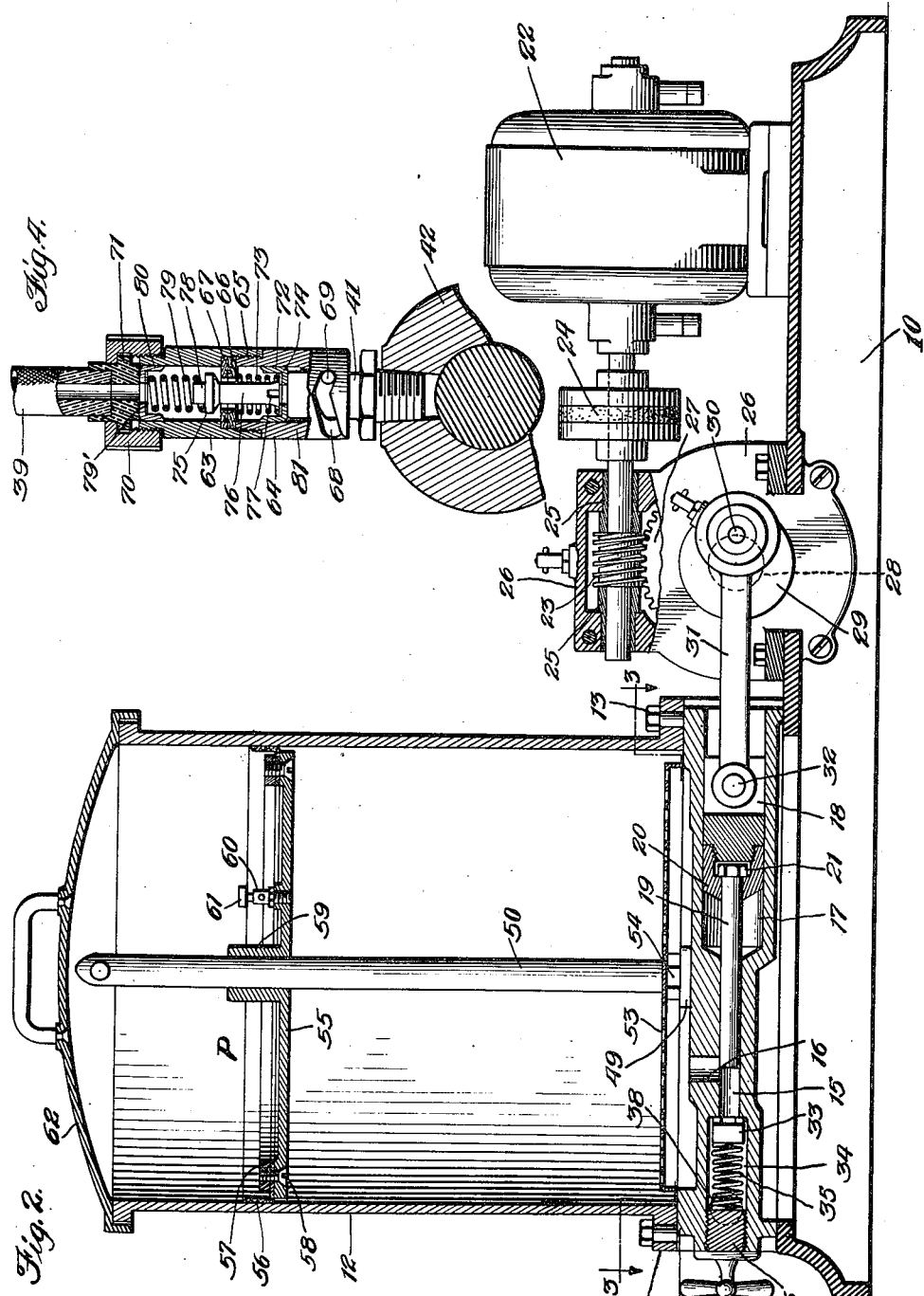
Inventor
Ernest. W. Davis.
By Earl A. Pierce
atty.

Patented Jan. 29, 1929.

1,700,471

UNITED STATES PATENT OFFICE.

ERNEST W. DAVIS, OF OAK PARK, ILLINOIS, ASSIGNOR TO ALEMITE MANUFACTURING CORPORATION, OF CHICAGO, ILLINOIS, A CORPORATION OF DELAWARE.

LUBRICANT COMPRESSOR.

Application filed August 23, 1924. Serial No. 733,766.

My invention relates to improvements in lubricant compressors, and is particularly concerned with the provision of a novel type of lubricant compressor for supplying lubricant under high pressure to bearings to be lubricated.

The objects of my present invention are:

First. To provide a lubricant compressor comprising a receptacle of comparatively large capacity for holding a supply of lubricant, in combination with a high pressure pump or compressor to receive the lubricant from the receptacle, and transfer the lubricant under high pressure to the bearings to be lubricated.

Second. To provide a compressor of the character described comprising a valved discharge opening or outlet that can be attached and detached from the bearing to be lubricated.

Third. To provide a compressor such as described in which the valve in the valved outlet automatically closes when the outlet is disconnected from a bearing to which lubricant has been supplied.

Fourth. To provide a compressor of the character described that includes a constantly or continuously operating motor.

Fifth. To provide a compressor of the construction described above in which the motor and connected parts operate continuously and comprise means for preventing the building up of excessive pressure on the lubricant when the discharge of lubricant is interrupted or prevented; and, Sixth. To provide a compressor having the above features, and that is simple and rugged in construction and economical to manufacture.

Other objects of my invention will appear as this description progresses, reference being had to the accompanying drawings in which:

Figure 1 is an end elevation of a compressor embodying my invention.

Figure 2 is a side elevation partially in vertical, central, longitudinal section.

Figure 3 is a transverse section taken on line 3—3 of Figure 2, and

Figure 4 is a central longitudinal section through one form of valved outlet, or coupling member, that may be used as a part of my improved compressor, this coupling member being shown attached to a lubricating fitting that is in turn attached to a bearing to be lubricated.

Throughout the several views similar reference characters are used for referring to similar parts.

Referring to the drawings, my improved compressor comprises a base plate 10, of a suitable conformation for supporting the parts about to be described. A more or less circular bed plate 11, is mounted upon the base plate 10 and supports the receptacle 12 that is adapted to receive and hold a quantity of lubricant. The base plate 10, the bed plate 11, and receptacle 12 are clamped together by means of suitable screws 13 that pass through the flange 14, at the bottom of the receptacle 12, and into the base plate 10. A cylinder 15 is formed in the bed plate 11, and provided with an inlet port 16, that establishes communication between the cylinder 15 and receptacle 12. At one end the cylinder 15 communicates with an enlarged bore 17 that acts as a guide for the cross-head 18 which is connected with a plunger 19. The plunger 19 is mounted in the cylinder 15 by means of the thimble 20 that surrounds the head 21 on the plunger 19, and has a threaded connection with the inner end of the cross-head 18.

For reciprocating the plunger 19 in the cylinder 15, I provide any suitable type of motor, as for instance, the electric motor 22 that is connected with the worm 23 by means of a universal joint 24. The worm 23 is mounted in suitable bushings 25 that are in turn mounted in and supported by the gear housing 26. The worm 23 drives a worm gear 27 carried by the shaft 28, the ends of which are mounted in the gear housing 26. One end of the shaft 28 projects through the gear housing and carries the crank disk 29, carrying the eccentric crank pin 30, to which is secured one end of the pitman-rod 31. The opposite end of this pitman-rod is connected with the cross-head 18, by means of the cross-head pin 32.

From the above description it will be apparent that when the motor 22 is operating the plunger 19 will be reciprocated in the cylinder 15. Lubricant will enter the cylinder 15 from the receptacle 12 through the port 16, that is partially uncovered when the plunger 19 is at one extreme of its movement. When the plunger is then moved forward it will act as a valve, closing the port 16 so as to prevent the return of lubricant to the receptacle 12, and the lubricant in the cylinder 15 will be expelled past the valve 33 into valve bore 34.

The valve 34 is held in its closed position by means of a compression spring 35 one end of which abuts the valves 33 and the other end of which engages the inner end of the threaded plug 36. This plug is provided with a handle 37 by which it can be moved when desired. Continuous reciprocation of the plunger will cause the lubricant to flow through the valve bore 34 and the transversely extending passageway 38 formed in the bed plate 11. This passageway connects with one end of the flexible discharge conduit, 39, and the coupling member 40 at its free end. The construction of the coupling member will be described later more in detail. It will be sufficient to state that it is adapted to be connected with a fitting 41 secured to a bearing 42 that is to be lubricated.

Another cylinder bore 43 is formed in the bed plate 11 of the compressor and intersects passage-way 38. The outer end of the cylinder 43 is closed by means of a threaded plug 44. A pressure actuated plunger, or member 45 is reciprocably mounted in the cylinder 43 and terminates at its outer end in a cross-head 46. A compression spring 47, confined between the cross-head 46 and a portion of the bed plate 11 tends to hold the plunger 45 in its innermost position.

The cross-head 46 is connected by means of the link 48 with the lever 49 that is pivotally mounted upon the inner end of the guide-rod 50. The inner end of the guide-rod screws in the bed plate 11. The opposite end of the lever 49 slides upon the flat surface 51 formed in the bed plate and through which the inlet port 16 opens.

The coupling member 40 comprises, as will later be described, a valve that closes when the coupling member is detached from a fitting and thereby prevents any further discharge of lubricant through the discharge conduit. When this occurs, operation of the motor and plunger 19 will cause a continual increase of the pressure on the lubricant in the discharge conduit and unless means were provided for preventing such result, some portion of the mechanism would necessarily be broken by the extreme pressure developed on the lubricant. If the pressure in the discharge conduit continues to increase, this increased pressure will be communicated to the inner end of the plunger 45 and when a pre-determined pressure has been reached, will move the plunger against the tension of the spring to a position in which the free end of the lever 19 will be moved over the inlet port and act as a valve to prevent the passage of additional lubricant into the cylinder 15. When this takes place the plunger 19 will simply reciprocate idly in the cylinder without increasing the pressure on the lubricant in the discharge conduit. It will, of course, be understood that the spring 47 can be so proportioned as to make the valve mechanism just described effective for cutting off the supply of lubricant from the cylinder 15 at any desired pressure.

As soon as the coupler 40 is attached to another fitting the valve within it will be opened and, it being assumed that the spring 47 is strong enough to force lubricant into the bearing to which the coupling member 40 is adapted, the plunger 45 will move into the cylinder 43 under the tension of the spring 47 thereby uncovering the port 16 and permitting the high pressure pump mechanism described above to resume its operation of pumping, or forcing, lubricant through the discharge conduit 39.

Further to prevent the building up of high pressure in the discharge conduits 39. I provide a discharge port 52 in the bed plate 11 that establishes communication between the cylinder 43 and the receptacle 12. If for any reason, the valve mechanism described above fails to prevent the entrance of lubricant to the cylinder 15, and the pressure on the lubricant continues to increase, the plunger 43 will be moved against the tension of the spring 47 until ultimately the port 52 will be uncovered by the plunger and the lubricant after being pumped out through the passage 38 will flow through the bore 43 and the discharge port 52 back into the receptacle 12. In this manner the continued operation of the motor will simply cause the lubricant to be withdrawn from the receptacle 12 and discharged back into the receptacle without damage to the mechanism.

A screen plate 53 is secured to the lower end of the guide rod 50 by means of the nut 54, and may be removed with the guide rod when the latter is unscrewed. A displacing piston P is slidably mounted upon the guide rod 50. This piston comprises a face plate 55, the annular cup-leather 56 and clamping ring 57, all of which are secured together by means of screws 58. The face plate 55 is provided with a sleeve or hub 59 that slides upon the guide-rod 50. If desired, a valve 60 controlled by the thumb screw 61 may be provided for permitting the access of air to the inner face of the piston P when the receptacle 12 has been emptied and it is desired to remove the piston P from the receptacle so as to permit the refilling of the latter. It will, of course, be understood that if the plunger 19, discharges lubricant past the valve 33, and is then retracted, a substantial vacuum will be produced in the chamber 15 and the atmospheric pressure exerted on the outer face of the piston P will cause the latter to move downwardly and thus force the lubricant through the port 16 into the cylinder 15.

If desired, the receptacle may be provided with a suitable cover 62. This cover should not fit so tight that it will exclude the atmospheric pressure from the outer face of the piston P.

Referring now to Figure 4, I have here disclosed one type of coupling member that may be used as a part of my improved compressor. It should be understood that the specific details of this coupling member form no part of my invention, except as they co-act with the constructions heretofore described. This coupling member comprises an outer sleeve formed in two sections 63 and 64 threaded together as shown at 65, and clamping between them a metal washer 66 and a fiber valve seat 67. The outer end of the member 64 is provided with a bayonet slot 68 for receiving the pins or projections 69 extending from opposite sides of the fittings 41. The sleeve member 63 is connected with the discharge conduit 39 by means of a swivel construction comprising the collar 70 and the swivel member 71.

The cup-leather 72 is reciprocably mounted in the coupling member and forced outwardly by means of the compression spring 73, one end of which abuts against the washer 74 in the bottom of the cup-leather and the other end of which engages the washer 66.

The valve 75 is adapted to co-act with the valve seat 67, to prevent the escape of lubricant from the conduit 39 when the valve is in its closed position. This valve comprises the valve stem 76 that extends through the registering openings in the washer 66 and the valve seat 67, and has a slot 77 to permit the passage of lubricant through the openings in the bottom of the cup-leather. The inner end or face of the valve 75 has a boss 78 projecting therefrom and centering the spring 79. one end of which engages the valve 75 and the other end of which rests against a washer 79′ in the bottom of the cup-leather 80. It will, of course, be understood that the cup-leather 80 is provided to prevent the escape of lubricant between the members 63, 70 and 71.

When the coupling member just described is detached from a fitting, the cup-leather will move outwardly under the tension of the spring 73 until it rests against the shoulder 81, and the valve 75 closes under the tension of the spring 79 and the pressure of lubricant, thereby preventing the further discharge of lubricant from the discharge conduit.

While I have described the details of construction of the preferred embodiment of my invention, it is to be clearly understood that my invention is not limited to these details of construction, but is capable of other adaptations and modifications within the scope of the appended claims.

Having thus described my invention, what I claim is:

1. A lubricant compressor comprising a receptacle for holding a supply of lubricant, a cylinder having an inlet port communicating with said receptacle, a valved discharge conduit for said cylinder, a plunger for expelling lubricant from said cylinder into said conduit, a motor for reciprocating said plunger, a second cylinder communicating with said first named cylinder, a pressure actuated member in said second cylinder, a spring for resisting movement of said pressure actuated member, a valve for controlling the passage of lubricant through said inlet port, connections between said valve and said pressure actuated member, said second cylinder having a discharge port communicating with said receptacle, and uncovered by a predetermined movement of said pressure actuated member against the tension of said spring.

2. A lubricant compressor comprising a receptacle for holding a supply of lubricant, a cylinder having an inlet port communicating with said receptacle, a valved discharge conduit for said cylinder, a plunger for expelling lubricant from said cylinder into said conduit, a motor for reciprocating said plunger, a second cylinder communicating with said first named cylinder, a pressure actuated piston in said second cylinder, a spring for resisting movement of said piston, a valve comprising a pivoted blade adapted to slide over and thereby control the passage of lubricant through said inlet port, and link connections between said valve and said piston.

3. A lubricant compressor comprising a receptacle for holding a supply of lubricant, a cylinder having an inlet port communicating with said receptacle, a valved discharge conduit for said cylinder, a plunger for expelling lubricant from said cylinder into said conduit, a motor for reciprocating said plunger, a second cylinder communicating with said first named cylinder, a pressure actuated member in said second cylinder, pivoted blade for controlling the passage of lubricant through said inlet port, and connections between said blade and said pressure actuated member.

4. A lubricant compressor comprising a pump having a cylinder and a valved inlet, means, controlled by the pressure of the lubricant in said conduit, for controlling said valved inlet, said means including a liquid filled expansion chamber of greater volume than the pump cylinder, and other means controlled by the pressure exerted upon the lubricant for establishing a passageway of sufficient size to permit flow of the full normal pump capacity between said discharge conduit and said valved inlet, said two control means having certain elements in common.

5. A lubricant compressor comprising a liquid receptacle, pump having a cylinder, a valved inlet and a discharge conduit, means including a liquid filled expansion chamber of greater volume than the pump cylinder controlled by the pressure of the lubricant in said conduit, for controlling said valved inlet, and other means controlled by the said first means for establishing communication between said discharge conduit and said valved inlet through said receptacle.

6. A lubricant compressor comprising a supply receptacle, a pump having a cylinder, an inlet and an outlet, liquid filled means of greater volume than the pump cylinder controlled by the pressure of the lubricant in said outlet for controlling the passage of lubricant to said inlet, and means controlled by said last named means for establishing communication between said receptacle and outlet.

7. A lubricant compressor comprising a source of lubricant, a cylinder pump, and control means including a control cylinder of greater volume than the pump cylinder, a piston in said control cylinder subjected to the discharge pressure of the pump, and means actuated by movement of said piston for first preventing lubricant from entering said pump cylinder, and subsequently venting lubricant on the pressure side of said pump to the source of lubricant, said means for venting being of sufficiently great size to permit passage of the normal capacity of said pump.

8. A lubricant compressor comprising a source of lubricant, a pump having a cylinder and a valved inlet passage communicating with said source, a discharge conduit, and means operative upon a predetermined pressure in said conduit for opening a passage from said conduit to said source adequate to permit the by-pass of the normal discharge from said pump and closing said inlet passage.

9. A lubricant compressor comprising a receptacle, a cylinder formed in the base thereof, a passageway between said receptacle and said cylinder, a plunger for forcing lubricant from said cylinder, a valved discharge conduit, a second cylinder communicating with said discharge conduit and having a port to said receptacle, a valve adapted to close said passage, and a spring pressed piston in said second cylinder adapted to open said valve upon a predetermined pressure and to uncover said port upon a predetermined higher pressure.

10. A lubricant compressor comprising a source of lubricant, a plunger and cylinder pump, and control means including a control cylinder of greater volume than the pump cylinder, a piston in said control cylinder subjected to the discharge pressure of the pump, means actuated upon a predetermined movement of said piston for preventing lubricant from entering said pump cylinder, and a port of sufficient size to form a passage for the normal discharge of said pump, said port being between said control cylinder and said source and being adapted to be uncovered by said piston upon further movement thereof.

In witness whereof, I hereunto subscribe my name this 18th day of August, 1924.

ERNEST W. DAVIS.